United States Patent [19]
Maeng

[11] Patent Number: 5,959,667
[45] Date of Patent: Sep. 28, 1999

[54] VOICE ACTIVATED CAMERA PRESET SELECTION SYSTEM AND METHOD OF OPERATION

[75] Inventor: Joonyoul Maeng, Austin, Tex.

[73] Assignee: VTEL Corporation, Austin, Tex.

[21] Appl. No.: 08/647,225

[22] Filed: May 9, 1996

[51] Int. Cl.[6] .............................. H04N 5/232; H04N 7/14
[52] U.S. Cl. ............................................. 348/213; 348/15
[58] Field of Search ................................ 348/13–20, 143, 348/211, 213; 379/201; H04N 7/14

[56] References Cited

U.S. PATENT DOCUMENTS

| | | | |
|---|---|---|---|
| 3,601,530 | 8/1971 | Edson et al. | 178/5.6 |
| 4,054,908 | 10/1977 | Poirier et al. | 348/15 |
| 4,516,156 | 5/1985 | Fabris et al. | 348/211 |
| 4,536,887 | 8/1985 | Kaneda et al. | 381/92 |
| 4,980,761 | 12/1990 | Natori | 379/202 |
| 5,058,170 | 10/1991 | Kanamori et al. | 381/92 |
| 5,068,735 | 11/1991 | Tuchiya et al. | 348/213 |
| 5,179,421 | 1/1993 | Parker et al. | 356/152 |
| 5,206,721 | 4/1993 | Ashida et al. | 358/85 |
| 5,268,734 | 12/1993 | Parker et al. | 356/152 |
| 5,272,526 | 12/1993 | Yoneta et al. | 358/85 |
| 5,278,643 | 1/1994 | Takemoto et al. | 348/213 |

(List continued on next page.)

FOREIGN PATENT DOCUMENTS

| | | | |
|---|---|---|---|
| 61-198891 | 9/1986 | Japan | H04N 7/14 |
| 63-77282 | 4/1988 | Japan | H04N 7/14 |
| 63-206076 | 8/1988 | Japan | H04N 7/14 |
| 1-85491 | 3/1989 | Japan | H04N 7/14 |
| 1-140884 | 6/1989 | Japan | H04N 7/14 |
| 1-190092 | 7/1989 | Japan | H04N 7/14 |
| 1-259691 | 10/1989 | Japan | H04N 7/14 |
| 1-264487 | 10/1989 | Japan | H04N 7/14 |
| 6-62397 | 3/1994 | Japan | H04N 7/14 |

OTHER PUBLICATIONS

J.L. Flanagan, J.D. Johnston, R. Zahn, G.W. Elko; *Computer–Steered Microphon Arrays for Sound Transduction in Large Rooms*; J. Acoust. Soc. Am. Suppl., vol. 78, No. 5, (1985), pp. 1508–1518.

Paul C. Meuse, Harvey F. Silverman; *Characterization of Talker Radiation Pattern Using a Microphone Array*; LEMS, Division of Engineering, Brown University.

Harvey F. Silverman and Stuart E. Kirtman; *A Two–Stage Algorithm for Determining talker Location from Linear Microphone Array Data*; Computer Speech and Language (1992) 6, p. 152.

Pierre Zakarauskas and Max S. Cynader; *A Computational Theory of Spectral Cue Localization*; J. Acoust. Soc. Am. 94(3), Pt. 1; Sep. 1993;pp. 1323–1331.

Michael S. Brandstein and Harvey F. Silverman; *A New Time–Delay Estimator for Finding Source Locations Using a Microphone Array*; Laboratory for Engineering Man/Machine Systems; Techincal Report LEMS–116; Division of Engineering, Brown University; Mar. 1993.

*Primary Examiner*—Curtis A. Kuntz
*Assistant Examiner*—Xu Mei
*Attorney, Agent, or Firm*—Baker & Botts, L.L.P.

[57] ABSTRACT

A voice activated camera preset selection system (15) is provided. The system includes a preset storage unit (17) operable to store a plurality of camera presets (21). Each camera preset (21) defines a camera preset location and camera preset data. A preset selector (16) is coupled to the preset storage unit (17). The preset selector (16) is operable to receive position data representing a speaker location based upon the voice of the speaker. The preset selector (16) is also operable to select a camera preset (21) from the plurality of stored camera presets (21) by determining a camera preset (21) that defines a camera preset location that is proximate the speaker location. The preset selector (16) is further operable to provide camera preset data defined by the selected camera preset (21) to a camera controller (18) such that a camera (19) can be automatically moved to view the camera preset location defined by the selected camera preset (21).

32 Claims, 5 Drawing Sheets

U.S. PATENT DOCUMENTS

| | | | |
|---|---|---|---|
| 5,335,011 | 8/1994 | Addeo et al. | 348/15 |
| 5,382,972 | 1/1995 | Kannes | 348/15 |
| 5,396,287 | 3/1995 | Cho | 348/211 |
| 5,404,397 | 4/1995 | Janse et al. | 381/96 |
| 5,521,635 | 5/1996 | Mitsuhashi et al. | 381/110 |
| 5,528,289 | 6/1996 | Cortjens et al. | 348/13 |
| 5,568,183 | 10/1996 | Cortjens et al. | 348/15 |
| 5,572,248 | 11/1996 | Allen et al. | 348/20 |
| 5,581,620 | 12/1996 | Brandstein et al. | 381/92 |
| 5,583,565 | 12/1996 | Cortjens et al. | 348/15 |
| 5,625,410 | 4/1997 | Washino et al. | 348/154 |
| 5,638,114 | 6/1997 | Hatanaka et al. | 348/13 |
| 5,657,246 | 8/1997 | Hogan et al. | 348/13 |
| 5,675,374 | 10/1997 | Kohda | 348/20 |
| 5,686,957 | 11/1997 | Baker | 348/15 |
| 5,742,329 | 4/1998 | Masunaga et al. | 348/15 |
| 5,760,825 | 6/1998 | Grenier | 348/15 |
| 5,778,082 | 7/1998 | Chu | 348/15 |

VOICE ACTIVATED CAMERA PRESET SELECTION SYSTEM AND METHOD OF OPERATION

BACKGROUND OF THE INVENTION

In video conferencing systems, it can be desirable to provide a system that moves the camera so that the view of the camera changes as the speaker changes. In general, there are several conventional methods used to accomplish such camera movement, including automated camera tracking and camera preset methods.

One automatic tracking method employed in conventional video conferencing systems uses infrared (IR) and radio frequency (RF) technology. This conventional method uses a transmitter, carried by the speaker, and IR and RF receivers to triangulate the position of the transmitter. By using the IR and RF signals to compute a new position of the speaker and making appropriate changes in camera position, the camera can be moved to track the speaker. However, this type of system does not work well in a conference room environment where a number of persons may talk.

Some conventional systems use a camera preset method for tracking the camera to the speaker. In general, a "camera preset" is a set of control values for the camera that correspond to a particular view of the camera. A "camera preset location" is a point in space that is viewed by the camera when the camera is positioned according to a given camera preset. For example, a camera preset location can be a point in a conference room where it is expected that a speaker will be positioned, and the camera preset stores control values for making the camera view that position. Where the camera is a pan, tilt, zoom (PTZ) camera, the camera preset can include a value for each of the three parameters (pan, tilt, and zoom) that would control the view of the camera such that it views the camera preset location.

One conventional method for selecting a camera preset is a centralized preset device. In this method, each camera preset is associated with a button on a centralized control device. An operator can press the button associated with a particular camera preset when the operator desires the camera to view the associated camera preset location. In this manner, the operator can manually track the speaker by knowing the camera preset locations for each camera preset. This preset selection system suffers from its reliance on the operator, who can be slow to react or can forget to react. Furthermore, the number of camera presets is limited to the number of buttons on the centralized device.

Another conventional method is the use of a touch-to-talk microphone. This method associates each camera preset with each of a number of touch-to-talk microphones. When a user pushes the button to activate his microphone, the camera preset associated with that microphone is selected. The camera is then moved to view the camera preset location for that camera preset (which, if set-up correctly, should view the speaker).

There are several problems with the touch-to-talk microphone method. First, the number of functional camera presets is limited to the number of microphones available. Second, a speaker may forget to touch the microphone before speaking. Third, if more than one person presses the button on their touch-to-talk microphone, the camera will thresh between the two camera presets before settling. Also, after a video conferencing system is set up, it can be costly to add additional camera presets.

Use of a voice activated microphone is a variation of the press-to-talk microphone method. A voice activated system differs from the touch-to-talk system in that a user is not required to press a button to activate his microphone and cause selection of the camera preset associated with his microphone. The microphone recognizes when someone talks into it and activates itself. Once a microphone is activated, the camera preset for that microphone is selected. This method also has a number of problems, including limitations on the number of camera presets and the costs of adding additional camera presets.

A further conventional method for selecting camera presets uses an infrared transmitter having a button that the user can press. The transmitter signals that the button has been pressed, and the camera is moved to view the camera preset location associated with that infrared transmitter. This is a slight modification of the touch-to-talk microphone, and the associated problems of the touch-to-talk microphone are not solved.

SUMMARY OF THE INVENTION

In accordance with the present invention, a voice activated camera preset selection system and method of operation are provided that substantially eliminate or reduce disadvantages and problems associated with previously developed preset selection systems.

According to one aspect of the present invention, a voice activated camera preset selection system and a video conferencing system having such a system are provided. The voice activated camera preset selection system includes a preset storage unit operable to store a plurality of camera presets. Each camera preset defines a camera preset location and camera preset data. The voice activated camera preset selection system also includes a preset selector coupled to the preset storage unit. The preset selector is operable to receive position data representing a speaker location based upon the voice of the speaker. The preset selector is then operable to select a camera preset from the plurality of stored camera presets by determining a camera preset that defines a camera preset location proximate the speaker location. The preset selector is also operable to provide camera preset data defined by the selected camera preset to a camera controller such that a camera can be automatically moved to view the camera preset location defined by the selected camera preset.

According to another aspect of the present invention, a method is provided for voice activated camera preset selection. The method includes receiving position data representing a speaker location based upon the voice of the speaker. Using this position data, a camera preset is selected from a plurality of stored camera presets by determining a camera preset that defines a camera preset location proximate the speaker location. Camera preset data defined by the selected camera preset is then used to automatically move a camera to view the camera preset location defined by the selected camera preset.

A technical advantage of the present invention is that it provides automatic selection of camera presets to control a camera to view the location of a speaker without requiring user input to select the camera preset. In addition, this automatic selection can be activated by the voice of the speaker.

Another technical advantage of the present invention is that the number of camera presets can be more easily changed, the capacity for camera presets is large and the cost of assigning additional a camera preset is minimal.

A further technical advantage of the present invention is the use of a tolerance in selecting camera presets to avoid problems associated with automated tracking systems such as camera error due to loud background noises.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Figure 1:
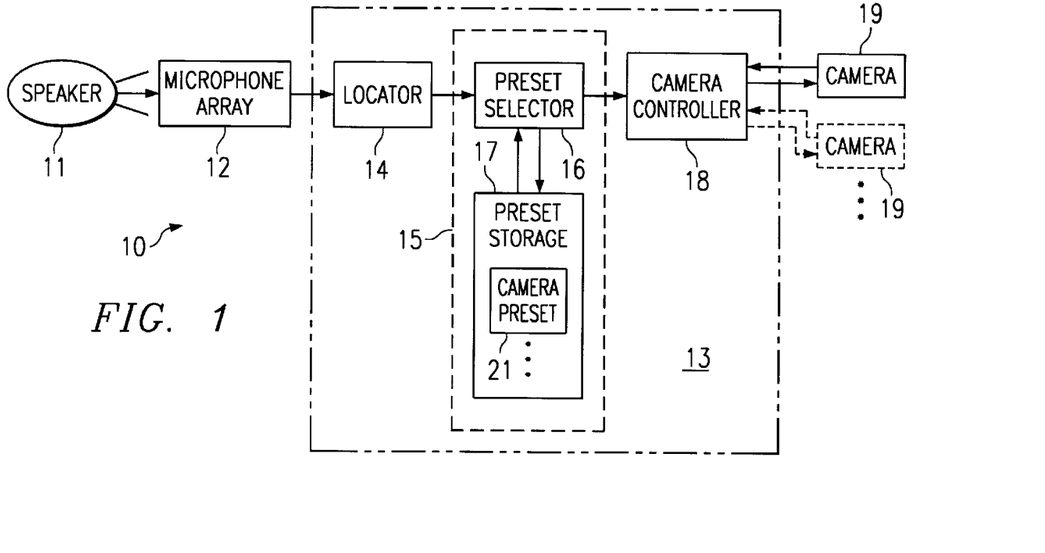
FIG. 1 is a block diagram of a video conferencing system having a voice activated camera preset selection system.

FIG. 1 is a block diagram of a video conferencing system, indicated generally at 10, having a voice activated camera preset selection system according to the teachings of the present invention. Video conferencing system 10 is useful for video conference applications where it is desirable for a camera to automatically track and view the location of a speaker 11.

Video conferencing system 10 includes a microphone array 12 to receive the voice of speaker 11. Microphone array 12 is operable to provide one or more audio signals representing the voice of speaker 11. Microphone array 12 is coupled to a conference control unit 13. Conference control unit 13 includes a locator 14 coupled to microphone array 12. Locator 14 is operable to receive audio signals from microphone array 12 and to provide position data representing a location of speaker 11.

Voice activated camera preset selection system 15 is coupled to locator 14. Preset selection system 15 comprises a preset selector 16 coupled to a preset storage unit 17. Preset storage unit 17 stores a plurality of camera presets 21. Each camera preset 21 defines a camera preset location and camera preset data. Preset selector 16 is coupled to locator 14 and receives the position data from locator 14. Preset selector 16 is operable to access the plurality of camera presets 21 and to provide camera preset data defined by a selected camera preset 21.

A camera controller 18 is coupled to preset selection system 15 and receives the camera preset data defined by the selected camera preset 21. Camera controller 18 is coupled to one or more cameras 19 which are operable to view the conference room. Camera controller 18 provides control signals to cameras 19 to control the view of cameras 19.

In operation, preset selector 16 selects a camera preset 21 based upon a comparison of the position data received from locator 14 and the camera preset locations defined by camera presets 21. Preset selector 16 then provides the camera preset data of a selected camera preset 21 to camera controller 18. Camera controller 18, in turn, provides control signals to camera 19 to move camera 19 to view the camera preset location of the selected camera preset 21. In an embodiment having more than one camera 19, camera controller 18 selects which cameras 19 to move to view the camera preset location.

According to the teachings of the present invention, preset selector 16 selects the camera preset 21 that defines a camera preset location proximate the location of speaker 11 as defined by the position data received from locator 14. In this manner, preset selection system 15 automatically selects the camera preset 21 that is most appropriate for viewing speaker 11. In one embodiment of the present invention, locator 14, preset selector 16, and camera controller 18 are implemented using software executed by computer hardware, and the preset storage unit is implemented using a data storage device.

In the embodiment of FIG. 1, video conferencing system 10 detects the voice of speaker 11 using microphone array 12. Microphone array 12 then produces audio signals representing the voice of the speaker 11. Microphone array 12 includes at least two microphones and provides audio signals from each microphone to locator 14. Locator 14 computes a speaker location based upon the audio signals and generates position data defining the speaker location. The position data can include, for example, Cartesian coordinates or polar coordinates defining the location of the speaker in one, two or three dimensions. Locator 14 then provides the position data to preset selector 16. In other embodiments of the present invention, locator 14 can generate position data based upon information about the speaker location other than audio signals from microphone array 12.

Preset selector 16 compares the location of speaker 11 defined by the position data to the camera preset locations defined by each camera preset 21 stored in preset storage unit 17. Preset selector 16 uses this comparison to determine which camera preset location is proximate, or spatially nearest, the location of speaker 11. Preset selector 16 then selects the camera preset 21 associated with that camera preset location. Preset selection system 15 provides the camera preset data defined by the selected camera preset 21 to camera controller 18, which in turn moves cameras 19.

Preset selector 16 can use different methods to select a camera preset 21 depending upon the form of the position data provided by locator 14. In general, camera presets 21 define the camera preset locations in three dimensions. However, locator 14 may provide position data to preset selector 16 that defines the location of speaker 11 in one, two, or three dimensions. Based upon the number of dimensions supplied by the position data, preset selector 16 uses a different method to determine which camera preset location is proximate the location of speaker 11.

Example of Position Data Defining a Speaker Location

In one embodiment of the present invention, locator 14 uses beamforming technology to determine the location of speaker 11. In general, beamforming technology allows the making of a prediction of the location of a source of sound by using the reception of the sound by a pair of microphones.

Figure 2A:
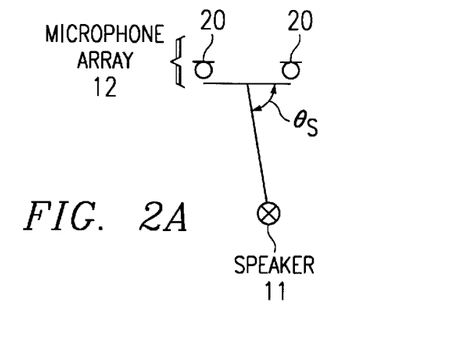
FIGS. 2A, 2B and 2C are diagrams of defining a position of a speaker in one, two and three dimensions.
Figure 2B:
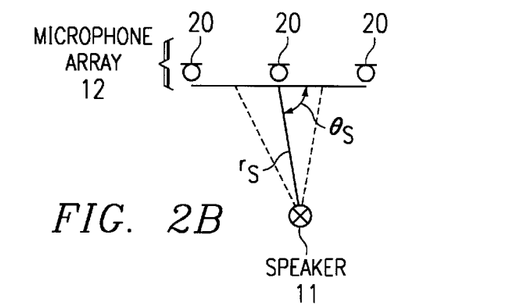
Figure 2C:
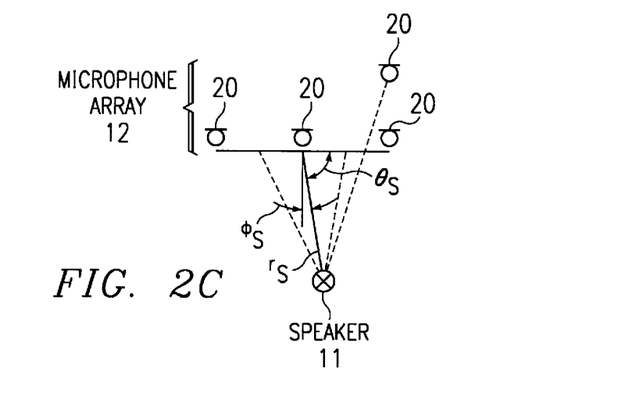

FIGS. 2A, 2B and 2C are diagrams of defining a position of speaker 11 in one, two and three dimensions using a microphone array 21 that has, respectively, at least two, three and four microphones 20.

FIG. 2A shows microphone array 12 having two microphones 20 which are spaced apart from one another. In this embodiment, the horizontal angle $\theta_s$ between speaker 11 and a line connecting the midpoint between microphones 20 can be determined based upon the audio signals generated by microphones 20. The speaker location can then be defined by position data in one dimension comprising the angle $\theta_s$.

FIG. 2B shows microphone array 12 having three microphones 20 which are spaced apart from one another as shown. In this embodiment, the speaker location can be defined in two dimensions. The horizontal angle $\theta_s$ and the distance to the speaker $r_s$ can be determined based upon the audio signals generated by microphones 20. The speaker location can then be defined by position data in two dimensions comprising the angle $\theta_s$ and the distance $r_s$.

FIG. 2C shows microphone array 12 having four microphones 20. In this embodiment, the location of speaker 11 can be defined in three dimensions. The horizontal angle $\theta_s$ and the distance $r_s$ can be defined as before. In addition, the vertical angle $\phi_s$ between speaker 11 and the horizontal plane perpendicular to the plane of the microphone array 12 can be determined based upon the audio signals generated by microphones 20. The speaker location can then be defined by position data in three dimensions comprising the angle $\theta_s$, $r_s$, and $\phi_s$.

Camera Preset Locations for Pan-Tilt-Zoom Cameras

In one embodiment of the invention, cameras 19 comprise pan-tilt-zoom (PTZ) cameras. In this embodiment, camera controller 18 stores camera control data associated with each camera preset 21 which includes a value for the pan, tilt, and zoom control settings of camera 19 when camera 19 is set to view the camera preset location. Each camera preset 21 can store the camera preset location in polar coordinates. These polar coordinates for the camera preset location can be determined by converting from the pan, tilt, and zoom settings of camera 19 for that camera preset location.

Figure 3:
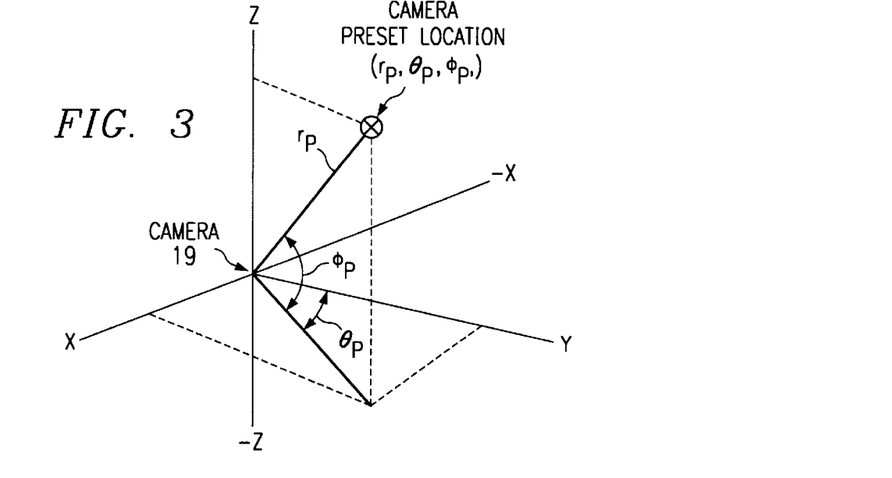
FIG. 3 is a diagram of identifying a camera preset location in polar coordinates.

FIG. 3 is a diagram of identifying a camera preset location in polar coordinates ($r_p, \theta_p, \phi_p$) based upon a position of camera 19. Characteristics of pan-tilt-zoom cameras vary, so the conversion between the pan-tilt-zoom settings of the camera preset and the polar coordinates defining the camera preset location depend upon camera specific characteristics. In general, the horizontal angle $\theta_p$ is directly related to the pan setting, the vertical angle $\phi_p$ is directly related to the tilt setting, and the distance $r_p$ is directly related to the zoom setting.

Figure 4A:
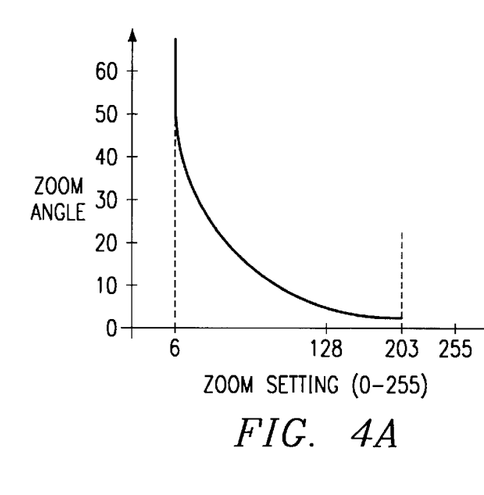
FIGS. 4A and 4B are a graph and diagram of using a zoom setting of a camera to estimate a distance from the camera.
Figure 4B:
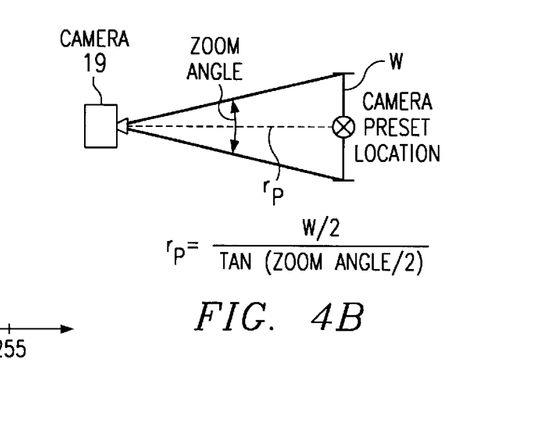

FIGS. 4A and 4B are a graph and diagram of using a zoom setting of a camera to estimate a distance from the camera. FIG. 4A is a graph of the relationship between the zoom setting, ZOOM SETTING, and the horizontal view angle, ZOOM ANGLE, of the camera. This relationship is camera specific, but generally follows the form of the graph of FIG. 4A. As shown, the zoom setting of the camera varies from zero to 255 to provide a zoom angle from a few degrees to 60 degrees.

FIG. 4B is a diagram of using the zoom angle defined by the zoom setting of the camera to estimate a distance from the camera $r_p$. In general, an assumption can be made about the width of the view provided by a camera preset in order to determine the distance $r_p$ between camera 19 and the camera preset location. This assumption is that the desired picture shows from shoulder to shoulder of a speaker, or about three feet. As shown in FIG. 4B, the distance $r_p$ can be determined by using the assumed width, W, and the ZOOM ANGLE. For example, if the zoom angle is 20 degrees and the assumed width is 3 feet, the distance $r_p$ is (3/2)/(Tan (20/2)), or about 8.5 feet.

Where pan-tilt-zoom cameras are used, there can be a pan, tilt, and zoom setting stored for each camera preset 21. Preset selector 16 can convert these pan, tilt, and zoom settings into polar coordinates ($r_p, \theta_p, \phi_p$) to define a point in space which is the camera preset location for each camera preset 21.

Using the camera preset locations, preset selector 16 can compare the location of speaker 11 with the camera preset locations to find the camera preset location that is proximate speaker 11. In one embodiment, locator 14 can determine the position of speaker 11 with respect to the center of microphone array 12, and preset selector 16 can determine the camera preset location of each camera preset 21 with respect to camera 19. If the center of microphone array 12 and camera 19 are not in the same position, some translation should be performed between the coordinate systems of the two locations in order to compare positions. The following discussion of comparing the speaker location and camera preset locations assumes that the locations have been translated to a common coordinate system.

Selection of Camera Preset when Speaker Location Defined in One Dimension.

Figure 5:
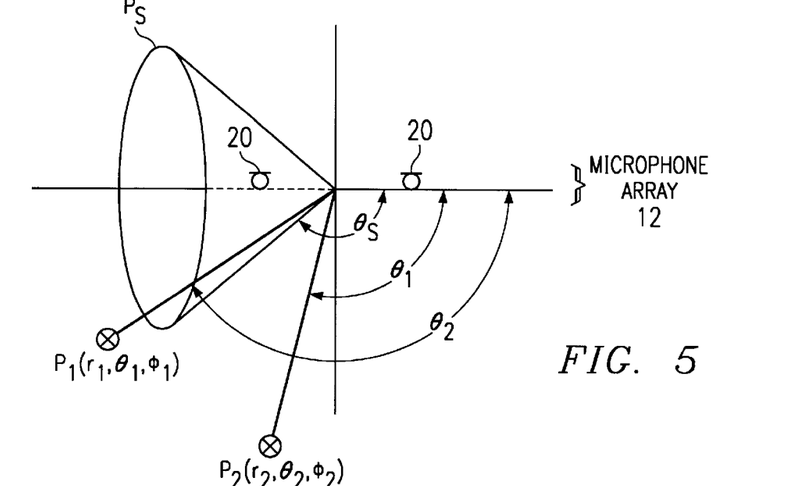
FIG. 5 is a diagram of a speaker location defined in one dimension in relation to camera preset locations.

FIG. 5 is a diagram of a speaker location, $P_s$, defined in one dimension, $\theta_s$, in relation to camera preset locations, $P_1$ and $P_2$. As shown, camera preset locations, $P_1$ and $P_2$, are defined by respective polar coordinates, ($r_1, \theta_1, \phi_1$) and ($r_2, \theta_2, \phi_2$). The position of the speaker is defined in one dimension by the horizontal angle of the speaker location, $\theta_s$. FIG. 5 shows that, when defined by $\theta_s$, the location of the speaker, $P_s$, is known to be on the surface of a cone. As discussed above, in one embodiment of the present invention, microphone array 12 having two microphones 20 can be used to provide audio signals from which locator 14 can determine the horizontal angle of the speaker location, $\theta_s$.

Figure 6:
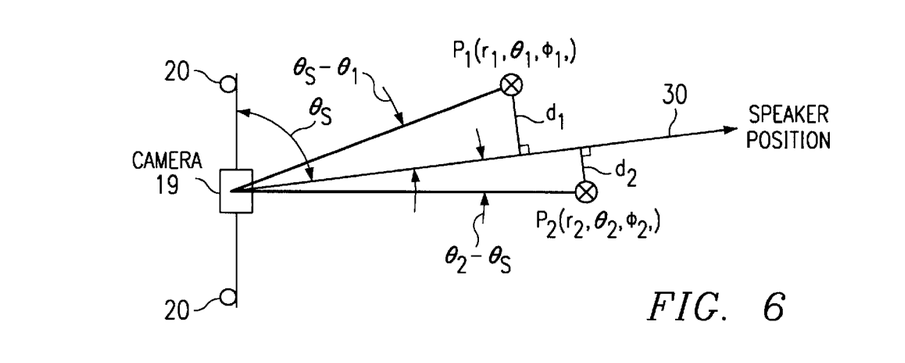
FIG. 6 is a diagram of selecting a camera preset based upon a speaker location defined in one dimension.

FIG. 6 is a diagram of selecting a camera preset, $P_1$ or $P_2$, based upon a speaker location, $P_s$, defined in one dimension. To determine which camera preset corresponds to the camera preset location that is proximate the speaker location, $P_s$, preset selector 16 could simply select the camera preset for which the camera preset location, $P_1$ or $P_2$, has a horizontal angle, $\theta_1$ or $\theta_2$, that is closest in value to the horizontal speaker angle $\theta_s$.

An alternative is to extend a line 30 from camera 19 along the horizontal speaker angle $\theta_s$. The normals, $d_1$ and $d_2$, to line 30 can be determined for camera preset locations, $P_1$ and $P_2$. Preset selector 16 can then select the camera preset for which the normal, $d_1$ or $d_2$, is smallest.

In general, there can be N camera presets, each camera preset associated with a camera preset location indicated by the polar coordinates $P_i = (r_i, \theta_i, \phi_i)$ where i=1,2,3 ... N. The above two methods can be used to select among the N camera presets, although other methods could also be used.

The first method can be referred to as the minimum angle difference method. In this method, preset selection 16 selects the camera preset that is associated with the camera preset location with the minimum angle difference, $\delta_{min}$. For each camera preset position $P_i$, the angle difference $\delta_i$ between the camera preset location and the speaker location can be defined as $\delta_i = ABS(\theta_s - \theta_i)$, where (i=1, 2, ... N), and where ABS is the absolute value of the difference.

The second method uses the minimum distance to an extended line. In this method, preset selection 16 selects the camera preset that is associated with the camera preset location with the minimum distance to the line extended on the horizontal speaker angle $\theta_s$. For each camera preset position $P_i$, the distance $d_i$ between the camera preset location and the extended line can be defined as $d_i = r_i * ABS(Sin(\theta_s - \theta_i))$, $(i=1, 2, \ldots N)$.

In the illustrated embodiment, a pair of microphones 20 are placed such that the pair of microphones 20 can determine the horizontal angle $\theta_s$ of the speaker. However, the microphones could be placed in a different manner. For example, by placing one microphone toward the ceiling and the other one toward the floor, the system could detect a vertical angle $\theta_s$ of the speaker location. In such an embodiment, the above analysis would be similar except that vertical angles would be used in the selection methods.

Selection of Camera Preset when Speaker Location Defined in Two Dimensions

Figure 7:
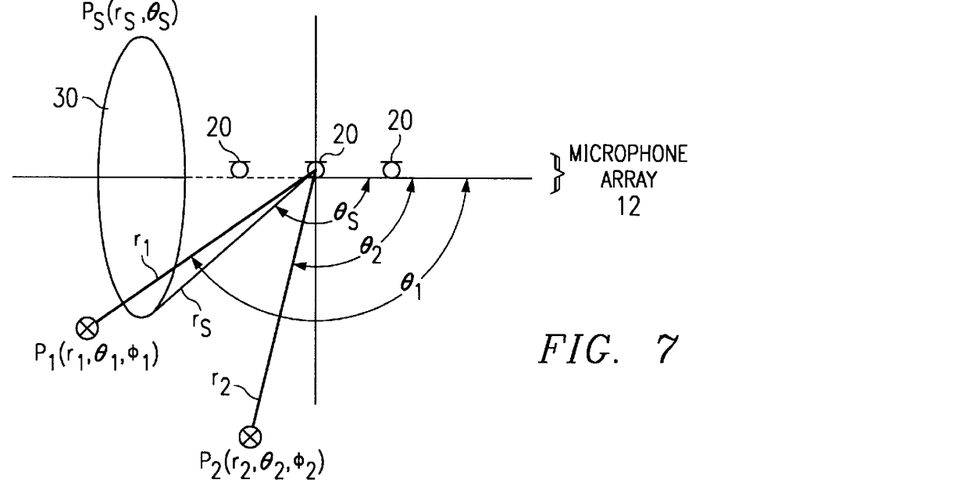
FIG. 7 is a diagram of a speaker location defined in two dimensions in relation to camera preset locations.

FIG. 7 is a diagram of a speaker location, $P_s$, defined in two dimensions, $\theta_s$ and $r_s$, in relation to camera preset locations, $P_1$ and $P_2$. FIG. 7 shows the relationship between two camera preset locations, $P_1$ and $P_2$, having polar coordinates, $(r_1, \theta_1, \phi_1)$ and $(r_2, \theta_2 \phi_2)$, and the speaker location, $P_s$. As shown, the distance $r_s$ and the angle $\theta_s$ define the location of the speaker to be on a circle. In the illustrated embodiment, a microphone array 12 having three microphones 20 can be used to provide audio signals from which locator 14 can determine the horizontal angle of the speaker location, $\theta_s$, and the distance, $r_s$.

Figure 8:
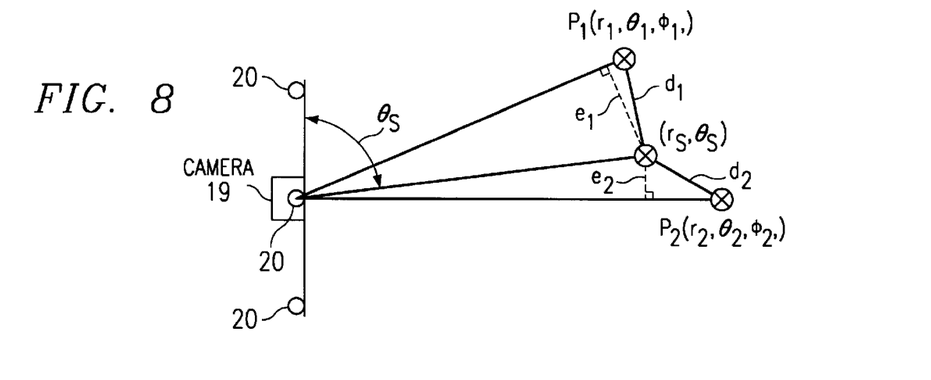
FIG. 8 is a diagram of selecting a camera preset based upon a speaker location defined in two dimensions.

FIG. 8 is a diagram of selecting a camera preset based upon a speaker location defined in two dimensions. FIG. 8 shows two camera preset locations, $P_1$ and $P_2$, and the polar coordinates of the two locations, $(r_1, \theta_1, \phi_1)$ and $(r_2, \theta_2, \phi_2,)$ respectively. The point $(r_s, \theta_s)$ represents the point in a horizontal plane that intersects the circle on which the speaker location lies. The distance, $r_s$, from camera 19 to the speaker location and the horizonal angle, $\theta_s$, are shown. In the illustrated embodiment, preset selector 16 selects the camera preset associated with the camera preset location, $P_1$ or $P_2$, that is closest to the location of the speaker.

The distance from the camera preset location $P_1$ to the point $P_s$ is shown as $d_1$. Likewise, the distance-from the camera preset location $P_2$ to the point $P_s$ is represented as $d_2$. For any given camera preset location $P_i$, the distance $d_i$ from that camera preset location to the point representing the speaker position in the appropriate plane can be calculated by the formula $d_i = SQRT(r_i * r_i + r_s * r_s - 2 r_i * r_s * Cos(\theta_s - \theta_i))$, where $(i=0,1,2,3 \ldots N)$, and where SQRT is the square root of the operand. By determining the camera preset location that minimizes this distance, preset selector 16 can select the camera preset location proximate the location of the speaker.

An alternate method for selecting the appropriate camera preset uses the length of the normals, $e_1$ and $e_2$, from the point representing the speaker location to the line encompassing each camera preset location. For a given camera preset location, $P_i$, this normal distance $e_i$ can be found by the formula $e_i = r_s Sin(\theta_s - \theta_i)$, $(i=0,1,2,3 \ldots N)$.

The speaker location could also be defined in two dimensions as the horizontal angle $\theta_s$ and the vertical angle $\phi_s$. With this definition, one method for selecting the appropriate camera preset would be to first select the set of camera presets associated with camera preset locations whose horizontal angle differences fall within a specified tolerance. Then, from this set of camera presets, the camera preset associated with the minimum vertical angle difference could be selected. For any given camera preset location, $P_i$, to find the horizontal angle difference $\delta_{ihorizontal}$, the value $\delta_{ihorizontal} = ABS(\theta_s - \theta_i)$ can be determined. Similarly, to find the vertical angle difference, the value $\delta_{ivertical} = ABS(\phi_s - \phi_i)$, can be determined.

In addition, it should be understood that the methods described with respect to the speaker location defined in one dimension would also work in the case where the speaker location is defined in two dimensions.

Selection of Camera Preset when Speaker Location Defined in Three Dimensions

Figure 9:
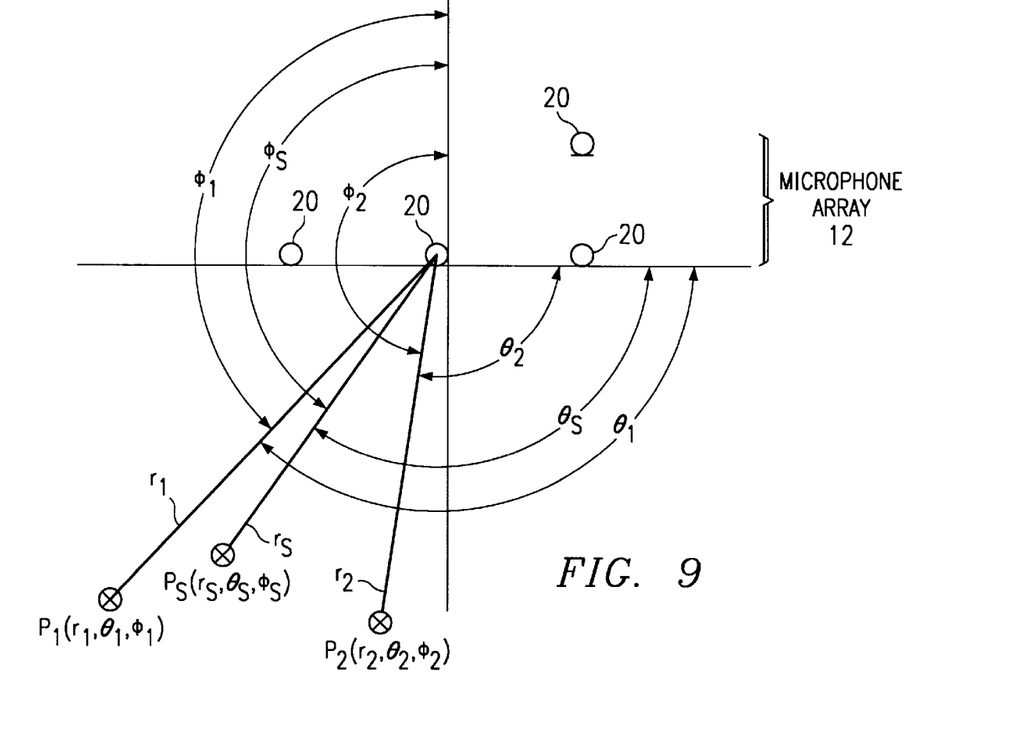
FIG. 9 is a diagram of a speaker location defined in three dimensions in relation to camera preset locations.

FIG. 9 is a diagram of a speaker location, $P_s$, defined in three dimensions, $(r_s, \theta_s, \phi_s)$ in relation to camera preset locations, $P_1$ and $P_2$. As shown, the illustrated embodiment contains four microphones 20 in microphone array 12 to allow locator 14 to determines the horizontal angle $\theta_s$, the distance $r_s$, and the vertical angle $\phi_s$. FIG. 9 shows a relationship between the two camera preset locations, $P_1$ and $P_2$, defined by their respective polar coordinates, $(r_1, \theta_1, \phi_1)$ and $(r_2, \theta_2, \phi_2)$, and the speaker location, $P_s$.

The distance between each camera preset location and the speaker location can be calculated as the distances between the polar coordinates. Preset selector 16 can then select the camera preset that has a camera preset location nearest to the speaker location. In addition, the methods described above for one dimensional and two dimensional speaker locations can also be used to select a camera preset. It should be understood that a method for selecting a camera preset when the speaker location is defined in one dimension also will work for two and three dimensions. Likewise, a method for the speaker location in two dimensions also will work for three dimensions.

De-Selection of Camera Preset using Tolerance

In one embodiment of the present invention, preset selector 16 is operable to make a tolerance determination before providing camera preset data to camera controller 18. If preset selector 16 determines that a selected camera preset 21 defines a camera preset location that is outside a desired window, preset selector 16 can de-select that camera preset 21 so that the view of cameras 19 remain unchanged. The tolerance can be compared with the distances and angles used to select a camera preset according to the methods described above.

The tolerance can take different forms. For example, the tolerance could be defined with respect to the viewing angle of each camera preset. In this case, preset selector 16 could select a particular camera preset that consists of pan, tilt, and zoom settings for camera 19. As discussed above, the zoom setting can be associated with a horizontal viewing angle. Present selector 16 could use one-half of this horizontal viewing angle as the tolerance to define a window for that camera preset. If the speaker location is outside the desired window around the camera preset location, the preset selector can de-select the camera preset.

Use of Multiple Cameras to Avoid Panning Display

Where there are two or more cameras 19, camera controller 18 can operate such that an inactive camera is moved to view the selected camera preset location while the active camera remains viewing its current location. When the inactive camera completes its move, camera controller 18 can switch the cameras. In this manner, a first camera 19 can view the previous speaker while a second camera 19 is moving to view a new speaker. Once the second camera 19 stops moving, camera controller 18 can switch the second camera 19 to be active. Such an operation eliminates the display of a panning view while a camera is moving to view a new speaker.

Setting Camera Presets and Defaults

Figure 10:
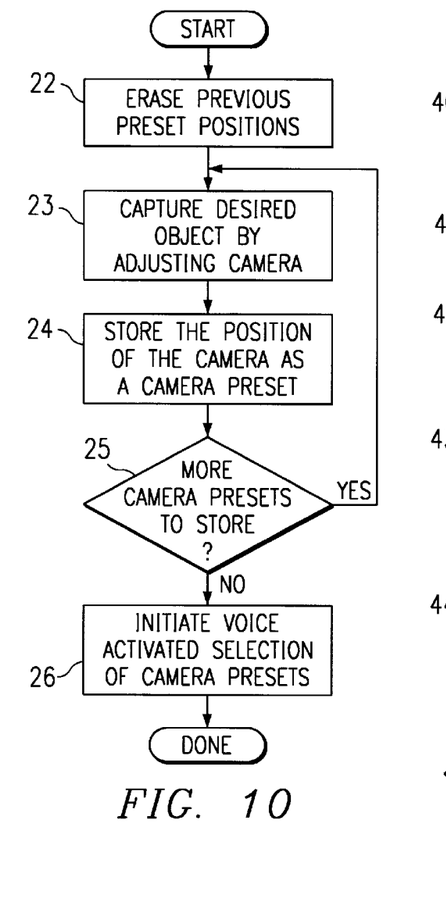
FIG. 10 is a flow chart of a method for setting camera presets.

FIG. 10 is a flow chart of a method for setting camera presets. This method allows preset storage unit 17 to be set up with camera presets 21 prior to initiation of a video conference. In general, camera 19 can be operated to view different locations in the conference room, and the camera settings for those locations stored for each desired camera preset 21. This provides the plurality of camera presets 21 from which preset selector 16 can select.

Specifically in the embodiment of FIG. 10, any previously stored camera preset positions are erased in step 22. This can be accomplished, for example, by pressing a "Clear All" button on a controller device. The controller device can be a hand-held remote, a tablet, or other similar device.

After previous preset positions are erased, a desired object (e.g., position in the conference room) is captured by adjusting the camera to view the object in step 23. For a pan-tilt-zoom camera, this can include adjusting the camera using "Up, Down, Left, Right, Zoom In and Zoom Out" buttons on a controller device. In step 24, the position of the camera is stored as a camera preset. This can be accomplished, for example, by pressing a "Store Preset" button on a controller device.

In step 25, the method checks whether there are more camera presets to store. This can be limited by the number needed by the user or by a specified maximum for the system. If there are more camera presets to be stored, the method returns to step 23. If not, voice activated selection of camera presets is initiated in step 26. This initiation can be accomplished, for example, by pressing an "Auto" button on a controller device.

In addition, a show camera preset function can be implemented to allow a user to examine the stored camera presets and see each camera preset position. The user can be allowed to step through the various camera presets in sequence. This can be accomplished, for example, by pressing a "Show Preset" button on a controller device. The user can be allowed to move the camera to each camera preset by repeatedly pressing the button. The sequence could be, for example, from one side of the room to the other. The user could also be allowed to remove a preset during this examination, for example, by pressing a "Remove Preset" button on the controller device. Also, if the user wants to turn off the automatic preset selection, the user can be provided with a manual mode initiated, for example, by pressing a "Manual" button on a controller device.

Figure 11:
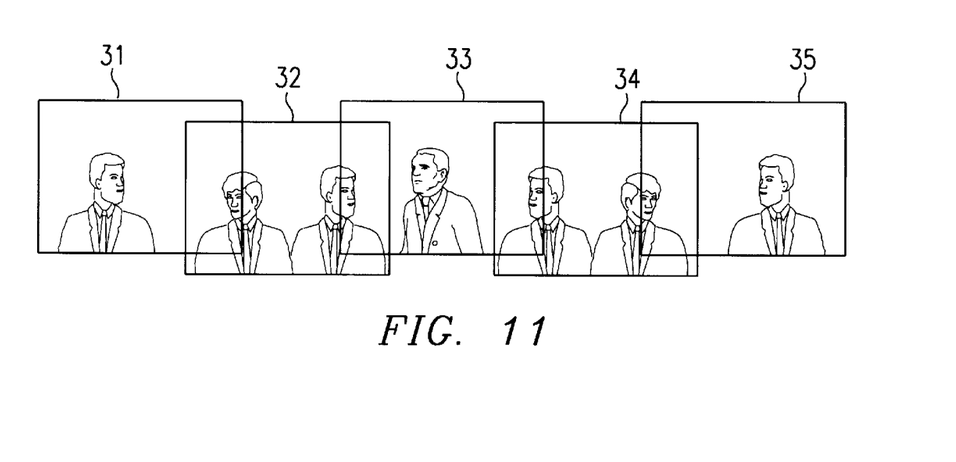
FIG. 11 is a diagram of multiple default camera presets used to view multiple camera preset locations in a video conference room.

FIG. 11 is a diagram of multiple default camera presets used to view multiple locations in a video conference room. Default camera presets can be programmed such that views 31, 32, 33, 34 and 35 of a conference room are covered by the camera presets. If set up to cover standard positioning of speakers in the conference room, the defaults can provide good coverage of the conference room without requiring users to store camera presets prior to initiating a conference.

In addition, the default camera presets can include a wide angle shot of the conference room. This camera preset can be activated when no one in the conference room talks for a specified period of time. For example, if there are five participants in a video conference call and no one talks for five seconds, the camera preset can be selected that moves the camera to a wide angle shot showing all five participants. The specified time period for activating the wide angle camera preset can be stored as an initial system parameter.

It is also possible for some systems to identify multiple speaker positions when more than one participant is speaking at the same time. In such a case where two participants are talking, a wide angle camera preset can be selected such that both speakers are in view. Alternatively, if two or more speakers are proximate two or more camera preset locations, two camera presets can be combined into one by zooming out the camera and selecting a center of the camera preset locations.

Method of Selecting Camera Presets

Figure 12:
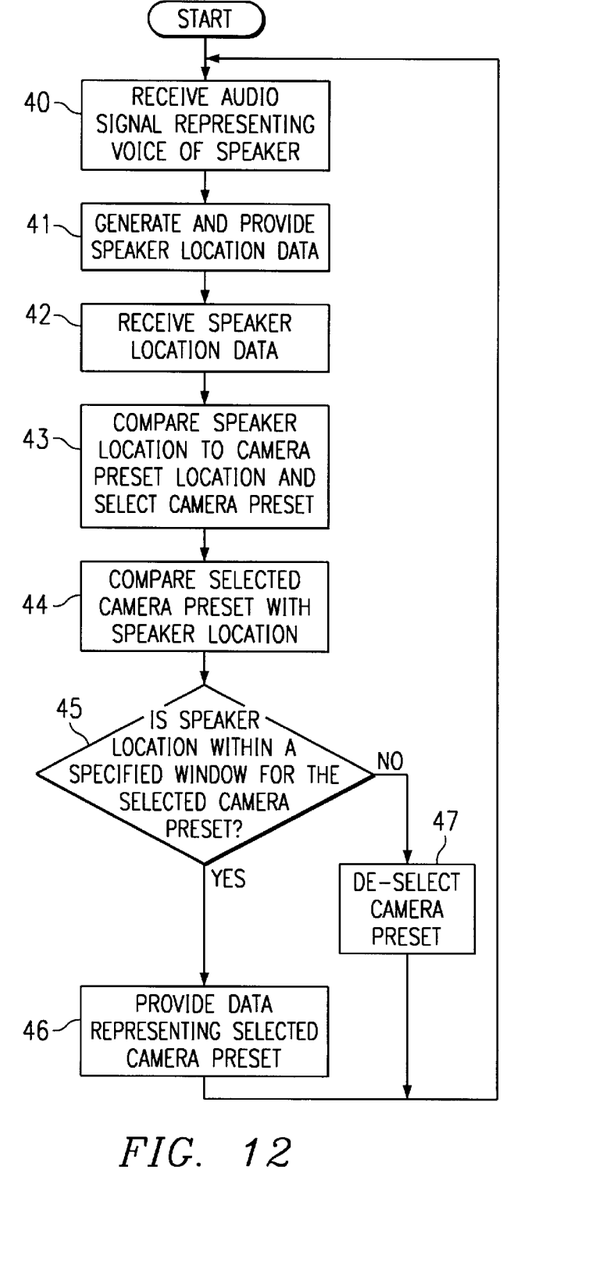
FIG. 12 is a flow chart of a method for voice activated camera preset selection.

FIG. 12 is a flow chart of a method for voice activated camera preset selection. In step 40, an audio signal representing the voice of a speaker is received. As described above, this audio signal can be produced by a microphone array and received by a locator in a conference control system. In step 41, speaker location data is generated and provided. As discussed above, the speaker location data can be generated based upon the audio signals, although other ways to identify the location of a speaker are possible. In step 42, the speaker location data is received by the voice activated preset selection system. As described above, this preset selection system can include a preset selector and a preset storage unit.

In step 43, the speaker location is compared to camera preset locations to select a camera preset. As described above, this comparison process identifies the camera preset location that is proximate the location of the speaker. In step 44, the camera preset location of the selected camera preset is compared with the speaker location. In step 45, selected camera preset is checked to determine whether the speaker location is within a specified window for the selected camera preset. If not, the camera preset is de-selected in step 47. If the speaker location is within the specified window, in step 46, data is provided representing the selected camera preset. That data can be used by a camera controller to move a camera to view the selected camera preset location.

Although the present invention has been described in detail, various changes, alterations and substitutions can be made thereto without departing from the spirit and scope of the invention as defined by the appended claims.

What is claimed is:

1. A voice activated camera preset selection system, comprising:
   a preset storage unit operable to store a plurality of camera presets, each camera preset defining a camera preset location and camera preset data; and
   a preset selector coupled to the preset storage unit, the preset selector operable to:
      receive position data representing a speaker location based upon the voice of the speaker;
      compare at least one camera preset location with the speaker location;
      determine a selected camera preset that defines a selected camera preset location that is proximate the speaker location; and
      provide camera preset data defined by the selected camera preset to a camera controller such that a camera can be moved to view the selected camera preset location.

2. The voice activated camera preset selection system of claim 1, wherein the selected camera preset is determined based upon position data defining the speaker location in one dimension.

3. The voice activated camera preset selection system of claim 1, wherein the selected camera preset is determined based upon position data defining the speaker location in two dimensions.

4. The voice activated camera preset selection system of claim 1, wherein the selected camera preset is determined based upon position data defining the speaker location in three dimensions.

5. The voice activated camera preset selection system of claim 1, wherein the preset selector is further operable to de-select the selected camera preset if a spatial distance between the selected camera preset location and the speaker location represented by the position data is not within a specified tolerance.

6. The voice activated camera preset selection system of claim 1, further comprising a locator unit operable to determine and provide the position data based upon the voice of a speaker.

7. The voice activated camera preset selection system of claim 1, wherein the camera preset data corresponds to one of a plurality of sets of camera control data stored by the camera controller.

8. The voice activated camera preset selection system of claim 1, wherein the camera preset data comprises camera control data for controlling the view of the camera.

9. The voice activated camera preset selection system of claim 1, wherein the preset selector is implemented using software operable to cause a computer to perform functions of the preset selector, and wherein the preset storage unit is implemented using a data storage device.

10. The voice activated camera preset selection system of claim 1, wherein one camera preset defines a wide angle camera preset location and wherein the preset selector is operable to select the one camera preset when no position data is received for a specified period of time.

11. The voice activated camera preset selection system of claim 1, wherein the preset selector is further operable to combine two camera presets when there are active speakers in a plurality of locations.

12. A video conferencing system having a voice activated camera preset selection system, comprising:
a camera operable to receive control signals for controlling a view of the camera;
a microphone array comprising a plurality of microphones, the microphone array operable to receive a voice of a speaker and to provide an audio signal representing the voice of the speaker;
a locator coupled to the microphone array, the locator operable to receive the audio signal, to generate position data representing a speaker location using the audio signal, and to provide position data;
a preset storage unit operable to store a plurality of camera presets, each camera preset defining a camera preset location and camera preset data;
a preset selector coupled to the preset storage unit and to the locator, the preset selector operable to:
receive the position data from the locator;
compare at least one camera preset location with the speaker location;
determine a selected camera preset that defines a selected camera preset location that is proximate the speaker location; and
provide camera preset data defined by the selected camera preset;
a camera controller coupled to the preset selector and to the camera, the camera controller operable to receive the camera preset data from the preset selector and to provide control signals to the camera based upon the camera preset data, such that the camera is moved to view the camera preset location defined by the selected camera preset.

13. The video conferencing system of claim 12, further comprising a second camera coupled to the camera controller, the second camera operable to receive control signals from the camera controller for controlling a view of the second camera.

14. The video conferencing system of claim 13, wherein the camera controller is further operable to provide control signals to the second camera associated with a new selected camera preset while the first camera is active, the camera controller further operable to switch the second camera to be active after the second camera has completed moving to view the camera preset location associated with the new selected camera preset.

15. The video conferencing system of claim 14, wherein the camera controller is further operable to associate the first camera with a first set of at least one camera presets and associate the second camera with a second set of at least one camera presets, such that only a camera associated with a set of camera presets is moved when a camera preset in the set is selected.

16. The video conferencing system of claim 12, wherein the position data provided by the locator defines the speaker location in one dimension.

17. The video conferencing system of claim 12, wherein the position data provided by the locator defines the speaker location in two dimensions.

18. The video conferencing system of claim 12, wherein the position data provided by the locator defines the speaker location in three dimensions.

19. The video conferencing system of claim 12, wherein the locator, the preset selector, and the camera controller are implemented using software operable to cause a computer to perform functions of the locator, the preset selector, and the camera controller, and wherein the preset storage unit is implemented by a data storage device.

20. The video conferencing system of claim 12, wherein the preset selector is further operable to de-select the selected camera preset if a spatial distance between the selected camera preset location and the speaker location represented by the position data is not within a specified tolerance.

21. The video conferencing system of claim 12, wherein the camera preset data corresponds to one of a plurality of sets of camera control data stored by the camera controller, and wherein the camera controller is operable to retrieve camera control data corresponding to the camera preset data and generate appropriate control signals based upon the camera control data.

22. The video conferencing system of claim 12, wherein the camera preset data comprises camera control data for controlling the view of the camera, and wherein the camera controller is operable to generate appropriate control signals based upon the camera preset data.

23. The video conferencing system of claim 12, wherein one camera preset defines a wide angle camera preset location and wherein the preset selector is operable to select the one camera preset when the preset selector receives no position data for a specified period of time.

24. The video conferencing system of claim 12, wherein the preset selector is operable to combine two camera presets when there are active speakers in a plurality of locations.

25. A method for voice activated camera preset selection, comprising:
receiving position data representing a speaker location based upon a voice of the speaker;
comparing at least one camera preset location with the speaker location;
determining a selected camera preset that defines a selected camera preset location that is proximate the speaker location; and
providing camera preset data defined by the selected camera preset to a camera controller such that a camera can be automatically moved to view the camera preset location defined by the selected camera preset.

26. The method of claim 25, wherein the selected camera preset is determined based upon position data defining the speaker location in one dimension.

27. The method of claim 25, wherein the selected camera preset is determined based upon position data defining the speaker location in two dimensions.

28. The method of claim 25, wherein the selected camera preset is determined based upon position data defining the speaker location in three dimensions.

29. The method of claim 25, wherein determining further comprises:

de-selecting the selected camera preset if a spatial distance between the selected camera preset location and the speaker location is not within a specified tolerance.

30. The method of claim 25, further comprising:

receiving an audio signal representing a voice of a speaker;

generating position data representing a speaker location using the audio signal; and providing the position data.

31. The method of claim 25, wherein determining comprises selecting one camera preset defining a wide angle camera preset location when no position data is received for a specified period of time.

32. The method of claim 25, wherein determining comprises combining two camera presets when there are active speakers in a plurality of locations.

* * * * *